United States Patent
Lee et al.

(10) Patent No.: US 6,493,752 B1
(45) Date of Patent: Dec. 10, 2002

(54) DEVICE AND METHOD FOR GRAPHICALLY DISPLAYING DATA MOVEMENT IN A SECURED NETWORK

(75) Inventors: Kangho Lee, Redmond, WA (US); James Daniel Wiggins, San Francisco, CA (US); David Wayne Bonn, Everett, WA (US); Randall Craig Boroughs, Woodinville, WA (US)

(73) Assignee: WatchGuard Technologies, Seattle, WA (US)

( * ) Notice: Subject to any disclaimer, the term of this patent is extended or adjusted under 35 U.S.C. 154(b) by 0 days.

(21) Appl. No.: 09/307,256

(22) Filed: May 6, 1999

(51) Int. Cl.[7] .............................................. G06F 15/173
(52) U.S. Cl. ........................ 709/223; 709/202; 709/224; 709/229; 713/153; 713/160; 713/201
(58) Field of Search ................................. 709/200–203, 709/217–219, 223–225, 227–229, 249; 713/200–201, 150, 153, 155, 160, 168–169; 707/9–10; 370/230–232, 235–236, 252–254

(56) References Cited

U.S. PATENT DOCUMENTS

| | | | | |
|---|---|---|---|---|
| 5,699,513 A | * | 12/1997 | Feigen et al. ................ | 713/201 |
| 5,768,552 A | | 6/1998 | Jacoby ........................ | 709/224 |
| 5,864,666 A | | 1/1999 | Shrader ....................... | 713/201 |
| 5,892,903 A | * | 4/1999 | Klaus ......................... | 713/201 |
| 6,108,310 A | * | 8/2000 | Wilkinson et al. .......... | 709/223 |
| 6,148,342 A | * | 11/2000 | Ho .............................. | 709/223 |
| 6,209,033 B1 | * | 3/2001 | Datta et al. ................. | 709/224 |
| 6,212,633 B1 | * | 4/2001 | Levy et al. ................. | 713/201 |
| 6,304,969 B1 | * | 10/2001 | Wasserman et al. ........ | 709/229 |
| 6,317,837 B1 | * | 11/2001 | Kenworthy ................. | 713/200 |

* cited by examiner

Primary Examiner—Bharat Barot
(74) Attorney, Agent, or Firm—Perkins Coie LLP

(57) ABSTRACT

Embodiments of the invention provide a display screen for a network security device. The screen includes representations of a source and a destination having respective source and destination indicators, such as LEDs. The source indicator is operable to indicate whether the source is authorized or unauthorized. The destination indicator is also operable to indicate whether the destination is authorized or unauthorized to receive the packet. A directional indicator oriented to point from the representation of the source to the representation of the destination is activated if the source and the received packet is authorized, The screen can further comprise additional indicators to indicate whether the security device is operational, to indicate a level of traffic through the security device, or to display a level of activity of a processor for the security device. The screen can be displayed on a computer screen.

40 Claims, 9 Drawing Sheets

DEVICE AND METHOD FOR GRAPHICALLY DISPLAYING DATA MOVEMENT IN A SECURED NETWORK

CROSS-REFERENCE TO RELATED APPLICATIONS

This application is related to U.S. patent application Ser. No. 09/306,646; entitled "Generalized Network Security Policy Templates for Implementing Similar Network Security Policies Across Multiple Networks still pending"; U.S. patent application Ser. No. 09/307,332, entitled "Managing Multiple Network Security Devices From a Manager Device still pending"; and U.S. Design patent Application Ser. No. 29/105,276, entitled "Portion of a Computer Screen or Display Panel with an Icon Image," now abandoned all filed concurrently herewith.

TECHNICAL FIELD

This invention relates to network security devices, and more particularly to displaying network security information.

BACKGROUND OF THE INVENTION

Computer networks are often vulnerable to attack. As long as companies use a public computer network, such as the Internet, for transferring files, sending e-mail, downloading programs, etc., there is always a chance that some malicious outsider (sometimes referred to as a "hacker") will find a way to obtain unauthorized access to a company's internal computer network (e.g., an "Intranet") used by the company's employees.

There are ways to make a network more resistant to an attack by hackers. For instance, a "firewall" software program acts as a gatekeeper between the Internet and a company's computer network. One type of firewall is known as a "packet filter." A traditional packet filter, which runs on a machine called a router, uses a rigid set of rules to allow or deny packets by examining a source address and a destination address of every packet of data going in or out of the company's network. This is somewhat analogous to a company's mailroom sorter who examines envelopes to make sure that they are both coming from a legitimate source address and/or bound for a legitimate destination address.

Another type of firewall is an application-level firewall (sometimes referred to as a "proxy"). In contrast to packet filters, traditional proxies work at the application level. This application-level firewall examines the contents of packets as well as their addresses, and therefore allows the company to implement a more detailed security screen for incoming and outgoing network traffic. A traditional proxy can be analogous to mailroom employees who x-ray bulky packages: the proxy scans packets for computer viruses or potentially dangerous Internet programs. However, in order to be installed and to operate, traditional proxies often require special modification or configuration to a company's existing network software.

Firewall programs sometimes include a software program that logs and records information associated with packets transmitted to and from the company's computer network. For instance, logging programs can record dates, times, and number of attempts that an outsider tries to repeatedly access the company's computer network.

However, such information is often recorded in large log files that require manual or automated data processing methods to later obtain selected records of packets that have interfaced with the firewall. It is desirable to be able to provide a firewall device that can easily interface with existing hardware and software and that provides some convenient indication of a real-time representation of network traffic at the firewall.

Figure 1:
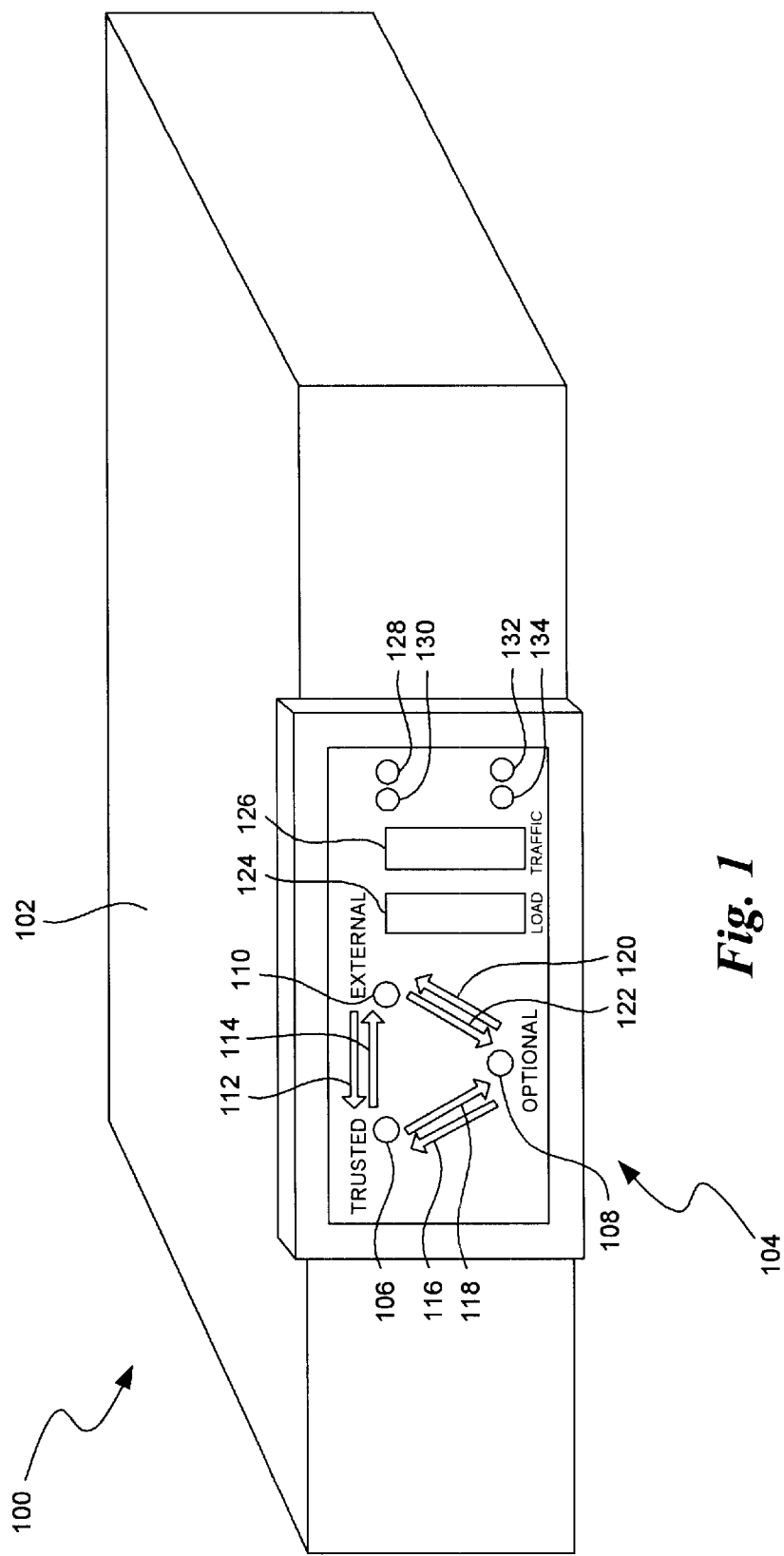
FIG. 1 shows an isometric view of a security device according to one embodiment of the invention, with an embodiment of a display screen shown thereon.

In the drawings, identical reference numbers identify similar elements. For ease in identifying the discussion of any particular element, the most significant digit in a reference number refers to the figure number in which that element is first introduced (e.g., element 204 is first introduced and discussed with respect to FIG. 2).

DETAILED DESCRIPTION OF THE ILLUSTRATED EMBODIMENTS

A network security device, and in particular, a screen and corresponding method for displaying network traffic information is described in detail herein. In the following description, numerous details are provided, such as brief descriptions of various network components that send and receive network traffic (see, e.g., FIG. 3) to provide a thorough understanding of embodiments of the invention. One skilled in the art, however, will recognize that embodiments of the invention can be practiced without one or more of these details or methods. In other instances, well-known structures or operations are not shown or not described in detail to avoid obscuring aspects of embodiments of the invention.

Figure 3:
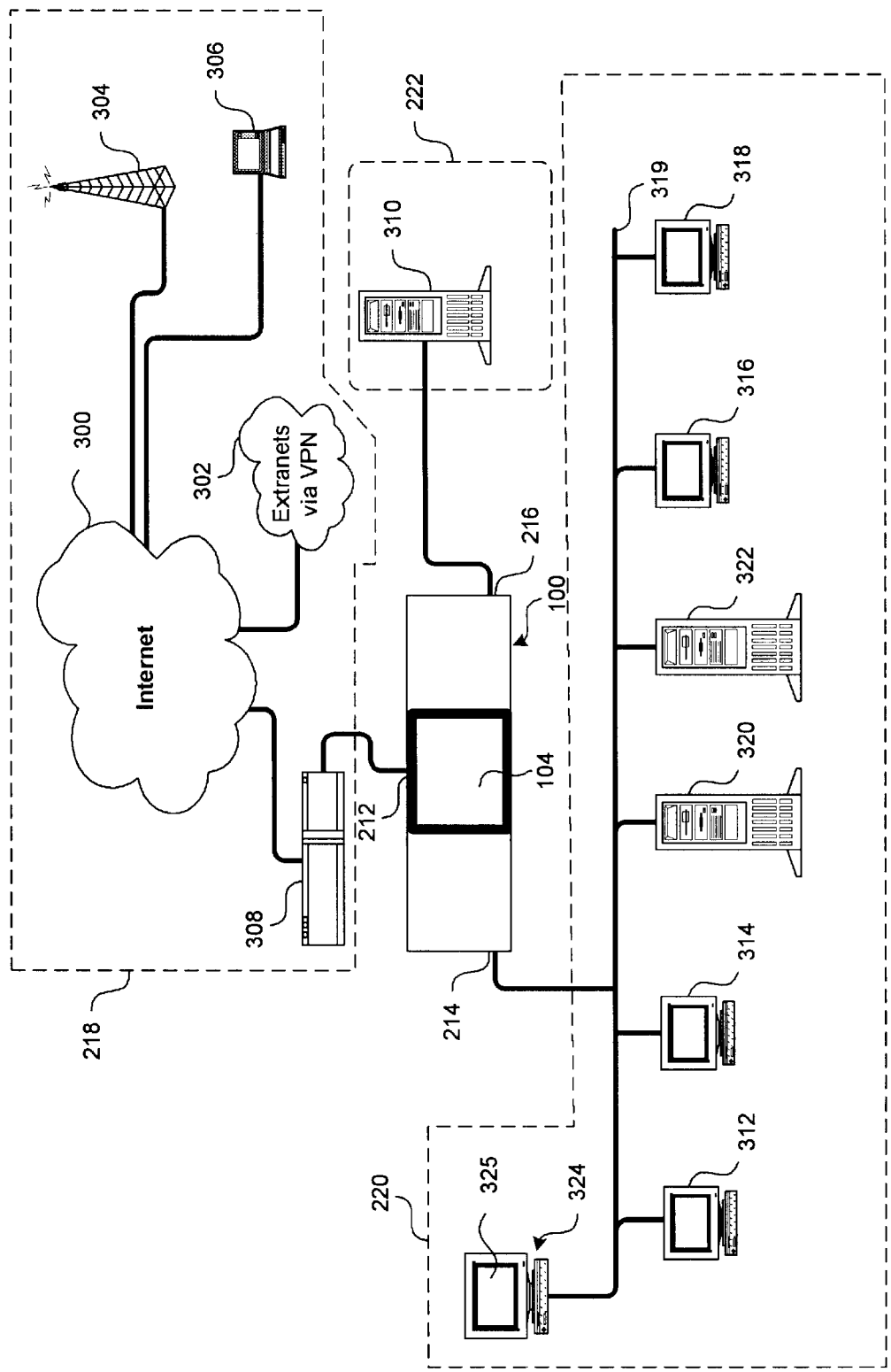
FIG. 3 shows a schematic view of how the embodiment of the security device of FIG. 1 can be connected to several types of networks.
Figure 4:
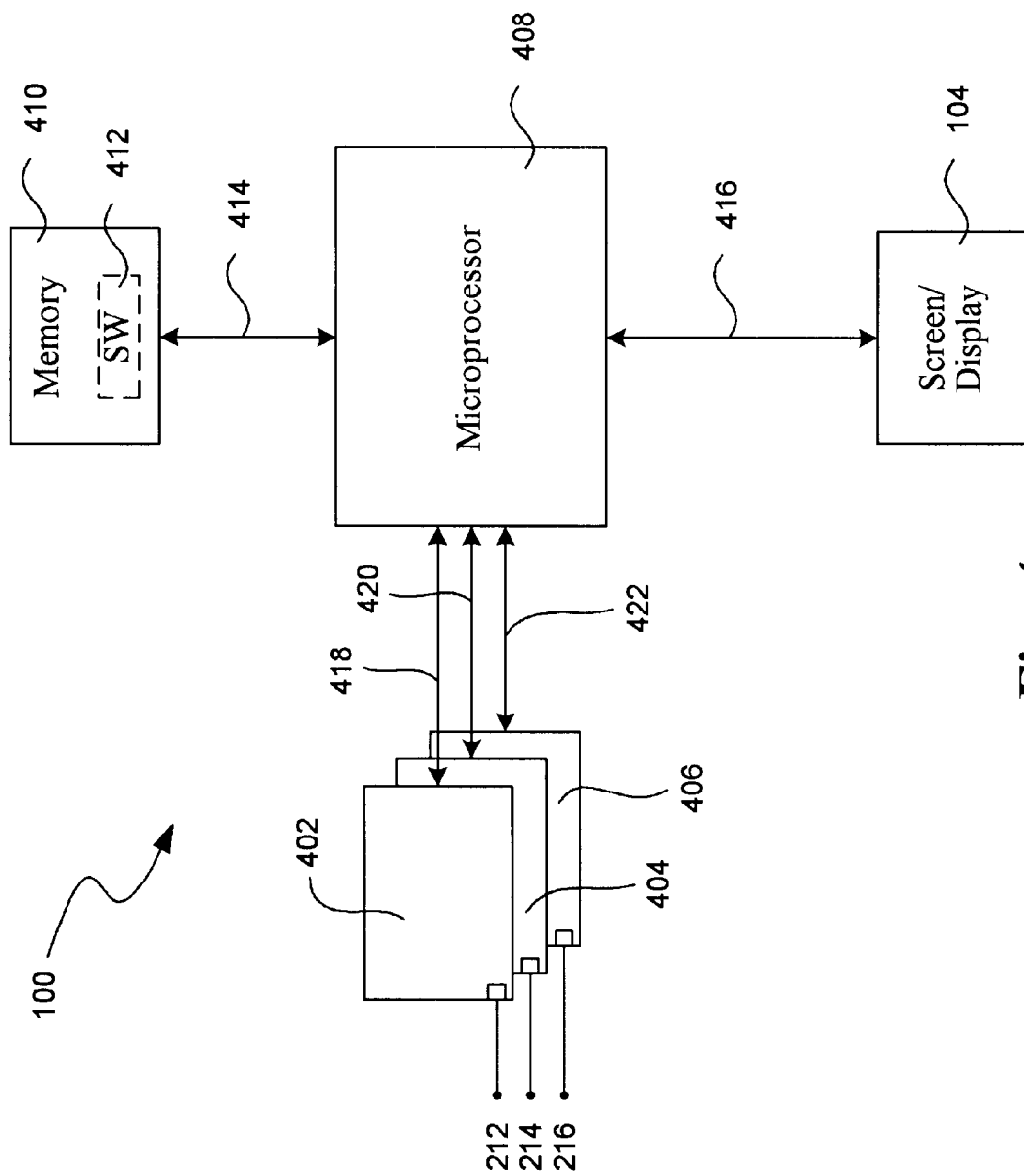
FIG. 4 shows a block diagram of the embodiment of the security device of FIG. 1.

Unless described otherwise below, the construction and operation of some components and blocks comprising the communication networks shown in FIG. 3 or the electronic schematic of FIG. 4 are of conventional design. As a result, such components or blocks are not described in detail herein, as they will be understood by those skilled in the relevant art. Such description is omitted for purposes of brevity and so as not to obscure the detailed description of embodiments of the invention. Any modifications necessary to what is shown in the Figures can be readily made by one skilled in the relevant art based on the detailed description provided herein.

Referring first to FIG. 1, shown generally at 100, is an embodiment of a network security device according to the invention that can be used as part of a company's firewall system. The security device 100 is contained within a housing 102, with an embodiment of a display screen 104 located at a front face of the security device 100. The security device 100 is a stand-alone network security appliance that can be "plugged-in" between a router 308 and a company's internal computer network (see, e.g., FIG. 3). A size of the housing 102 can be 15.5×2.85×10.5 inches, with the security device 100 having a weight of about 8 pounds, although other sizes and weights are possible.

The screen 104 is provided with three representations of network sources/destinations. A "TRUSTED" label represents the company's internal or "trusted" network (e.g., an "Intranet"), which is often desired to be protected to a maximum practical amount. An "EXTERNAL" label represents an external network (e.g., the Internet) that presents a security challenge to the company's internal network. An "OPTIONAL" label represents an optional network that the company may set up that is accessible to the general public. The optional network (sometimes referred to as a "demilitarized zone" or DMZ) allows customers to send e-mail to the company or to browse through the company's web site on the World Wide Web (WWW). The "TRUSTED" label has an indicator 106 associated therewith. Similarly, the "OPTIONAL" and "EXTERNAL" labels have indicators 108 and 110 respectively associated therewith.

A first directional indicator 112, when illuminated or activated, represents a packet of information sent from the external network to the trusted network. Similarly, a second directional indicator 114 represents a packet of information sent from the trusted network to the external network. There are similar directional indicators to represent packets sent between the optional network and the external and trusted networks. For example, a third directional indicator 116 represents a packet sent from the optional network to the trusted network, and a fourth directional indicator 118 represents a packet sent from the trusted network to the optional network. A fifth directional indicator 120 represents a packet of information sent from the optional network to the external network, and a sixth directional indicator 122 represents a packet of information sent from the external network to the optional network. In the embodiment of the screen 104 shown in FIG. 1, the directional indicators 112–122 are "directional" in that they are in the form of arrows. However, it is to be appreciated that other ways of displaying a directional flow of network traffic between the trusted, external, and optional networks are possible. For instance, packets moving in one direction can be represented by directional indicators having a first color, and packets moving in the opposite direction can be represented by directional indicators having a different color.

A load indicator 124 of the screen 104 represents a load on a microprocessor 408 (see, e.g., FIG. 4) of the security device 100. A traffic volume indicator 126 indicates a level of network traffic through the security device 100. There are several possible ways of indicating a load for the load indicator 124 and a level of network traffic for the traffic volume indicator 126. For example, a "low" range can be shown with a green light, with a "higher" range shown in yellow. Thus, different levels are indicated by different colors. In other embodiments, a single color can be used, with a level of network traffic or a load on the microprocessor 408 indicated by an amount or height of a colored portion illuminated in the load indicator 124 or in the traffic volume indicator 126.

The screen 104 further has an "armed" indicator 130 to indicate that the security device 100 is operational. A "disarmed" indicator 128, if activated, indicates that the security device 100 has detected an error, has shut down all of its interfaces, and will not forward any packets. System indicators 132 and 134 respectively indicate whether the security device 100 is running from a primary or secondary configuration.

Several types of display screens can be used to practice the embodiment of the screen 104 shown in FIG. 1. For instance, the screen 104 can comprise a multiple-segment liquid crystal display (LCD) or a multiple-segment, negative mode LCD. As is known in the art, segments of the LCD change to a dark shade when supplied with power and to a bright shade when not supplied with power. A negative mode LCD operates in an opposite manner. A backing (not shown), such as one having a silver color, for the screen 104 determines the different shades when the screen 104 is supplied with power (e.g., the screen 104 is silver when it is not supplied with power, and individual segments are dark when supplied with power). If the various indicators shown in the screen 104 of FIG. 1 are designed to display multiple colors (e.g., red, yellow, and green), then the screen 104 can comprise a backlit indicator panel with various colored light-emitting diodes (LEDs) providing the different colors of the indicators. Other types of display technology that can be used include a field emitter display (FED), active matrix display, cathode ray tube (CRT), etc. Specific details of how the screen 104 functions to provide information associated with network traffic will be described in further detail below with reference to FIG. 6.

Figure 2:
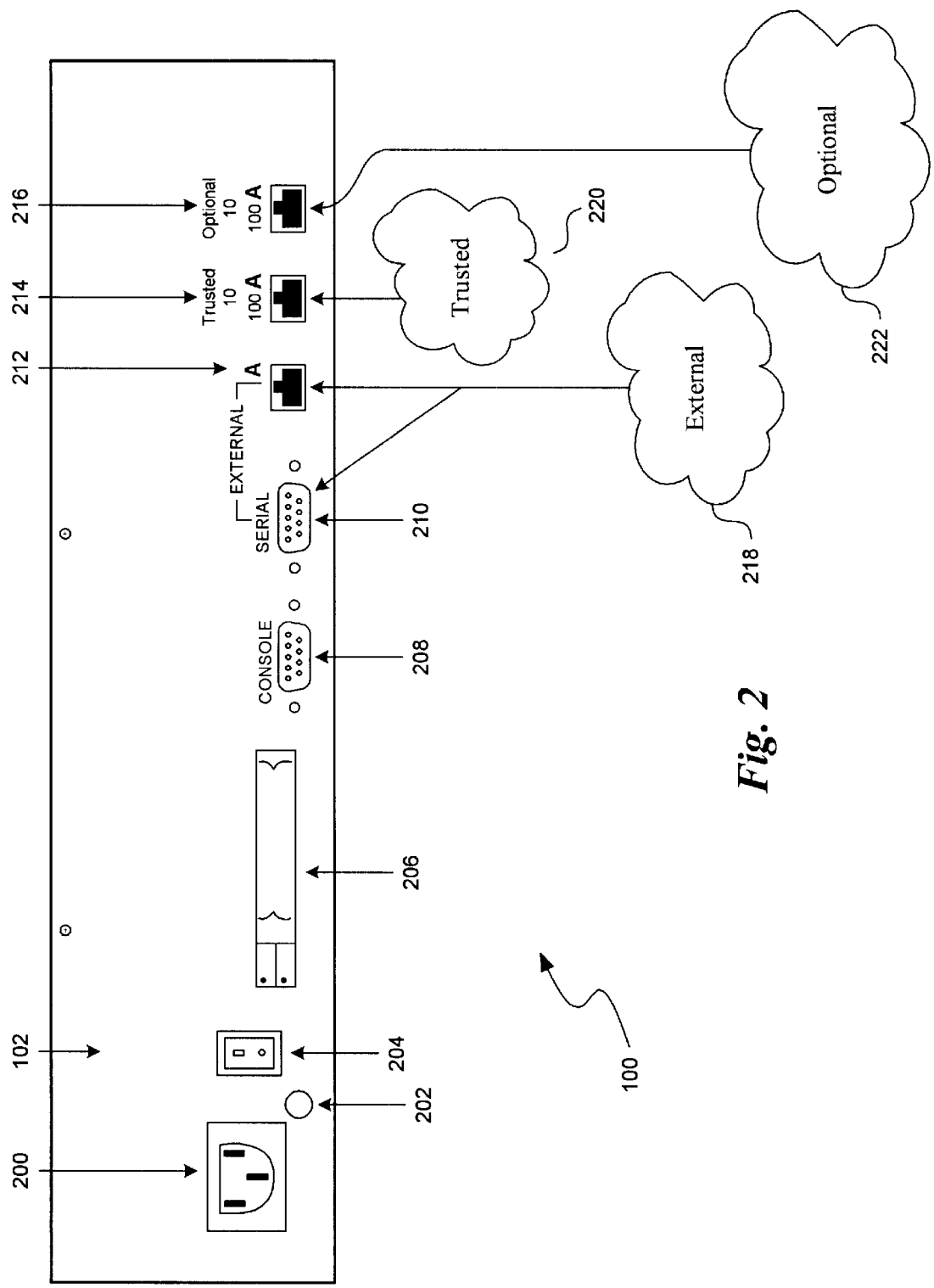
FIG. 2 shows a rear panel view of the embodiment of the security device shown in FIG. 1.

FIG. 2 shows a rear panel view of the security device 100. An AC receptacle 200 receives AC power (e.g., 100–240V AC, 50/60 Hz) provided to the security device 100 from an AC power supply (not shown). A "power-on" LED 202 indicates if the security device 100 is receiving AC power. A power switch 204 turns the security device 100 on or off. A slot 206 accepts a Personal Computer Memory Card International Association (PCM-CIA) card, such as a modem card to facilitate out-of-band transmissions or management. A Type II PCM-CIA card slot can be used for the slot 206. A console port 208 allows a workstation to be coupled thereto, so as to configure the security device 100 from any Service Management System (SMS) workstation (see, e.g., an SMS station 324 in FIG. 3.) A serial port 210 provides a serial interface for supported modems. A DB-9 serial port having a standard nine-pin RS-232-C interface can be used for the serial port 210.

The security device 100 has three Ethernet ports using standard eight-pin RJ-45 connectors: a port 212 for connection to an external network 218, a port 214 for connection to a trusted network 220, and a port 216 for connection to an optional network 222. Each of the ports 212, 214, 216 can have LEDs for each interface to indicate link status and card speed (e.g., shown in FIG. 2 as a "10" labeled LED for 10 megabits speed and a "100" labeled LED for 100 megabits), as well as an activity indicator marked as "A" in FIG. 2. For example, if an Ethernet card corresponding to one of the ports 212, 214, 216 is running at 10 megabits, the LED marked "10" will be lit, and if the Ethernet card is running at 100 megabits, the "100" LED will be lit. The security device 100 can be further provided on its back panel with a green light next to either the "10" LED or the "100" LED to signify that there is a good link between the security device 100 and the particular network 218, 220, 222.

FIG. 3 shows the trusted network 220, the external network 218, and the optional network 222 in more detail, as well as showing how the security device 100 can be connected to these networks. As evident from the network connections shown in FIG. 3, the security device 100 is in a position to control and monitor transmission and reception of network traffic (e.g., packets) sent between the trusted network 220, the external network 218, and the optional network 222.

The trusted network 220 comprises a network of user workstations 312, 314, 316, and 318 connected by a network bus 319. The trusted network 220 can further include an internal server 320 and a log host 322 that receives logs of network traffic from the security device 100. The SMS station 324 configures the security device 100, regulates incoming and outgoing access, and controls logging and notification associated with network traffic through the security device 100.

The optional network 222 can comprise a public server 310 used in Hyper-Text Transfer Protocol (HTTP) transmissions in connection with the WWW, Simple Mail Transfer Protocol (SMTP) for e-mail transmission and reception, File Transfer Protocol (FTP) communications, and Domain Name System (DNS) for translating domain names into Internet Protocol (IP) addresses, and other associated functions.

The external network 218 includes the Internet (shown as 300 in FIG. 3) connected to the security device 100 via the router 308. Other components of the external network 218 that can be connected to the Internet 300 include remote users 306 and miscellaneous external devices/systems 304. An example of the system 304 can be a broadcast system that allows software updates for the security device 100 to be externally sent to the SMS station 324.

An Extranet 302 can be connected to the Internet 300 via a Virtual Private Network (VPN). As is known in the art, the Extranet 302 is an Internet-like network that a company runs to conduct business with its employees, customers, and/or suppliers. Extranet networks are connected to each other and to the Internet 300 by using public wires to connect nodes, with individual Extranets using encryption and other security mechanisms to ensure that only authorized users can access a particular Extranet network.

FIG. 4 shows a block diagram for the security device 100. The security device 100 includes three Ethernet cards 402, 404, 406 to process network traffic information and data associated with the corresponding external network 218, trusted network 220, and optional network 222. The Ethernet cards 402, 404, 406 are respectively coupled to the ports 212, 214, 216. The Ethernet cards 402, 404, 406 are in turn operatively coupled to the microprocessor 408 via respective lines 418, 420, 422. The microprocessor 408 is coupled to the screen 104 by one or more lines 416 that allow the microprocessor 408 to control the individual indicators (see, e.g., FIG. 1) of the screen 104. While Ethernet cards 402, 404, 406 are shown herein, it is to be appreciated that principles of embodiments of the invention can be applied to other types of network systems, protocols, and interfaces (e.g., token rings, AppleTalk, Netware, etc.). Also, although only three Ethernet cards 402, 404, 406 and a single microprocessor 408 are shown and described herein, embodiments of the security device 100 can use any number of cards and microprocessors depending on the specific network traffic monitoring requirements of the company.

A memory 410 having stored thereon a software program 412 to operate the security device 100 is coupled to the microprocessor 408 via one or more lines 414. A flash memory can be used for the memory 410. The software program 412 can be any type of computer-readable or computer-executable instructions, such as program modules or macros executable by the microprocessor 408 or by a computer. Additionally, although the memory 410 and the software program 412 are shown in FIG. 4 as residing within the security device 100, it is to be appreciated that the memory 410 and/or the software program 412 can be located externally of the security device 100 and connected to the security device 100 via a bus system (e.g. the lines 414) that includes a memory bus, peripheral bus, and a local bus (not shown). For instance, the memory 410 and/or the software program 412 can reside in the SMS station 324 of the trusted network 220.

Further, the memory 410 and the software program 412 can comprise other types of computer-readable media and associated devices that store data accessible by a computer or by the microprocessor 408, such as magnetic cassettes, digital video disks (DVD), CD-ROMs, Bernoulli cartridges, random access memories (RAMs), read-only memories (ROMs), smart cards, etc., and can include other types of software programs, such as an operating system, one or more application programs, and other programs and data. Consequently, embodiments of the invention are not limited by the specific location of the components shown in FIG. 4, by the type of storage media and their associated devices, or by the specific type of software program stored therein.

The software program 412 can be configured to operate the security device 100 and the screen 104 according to the some of the following illustrative parameters and instructions. For example, a policy for the security device 100 regarding a default disposition of packets (sometimes referred to as a "stance") is set. The stance protects against attacks based on new, unfamiliar, or obscure transmissions/receptions. The stance dictates what the security device 100 will do with any given packet in the absence of explicit instructions. A common stance is to discard or refuse to pass all packets that are not explicitly allowed, often stated as "that which is not explicitly allowed is denied." A less-secure stance that can also be implemented is stated as "what is not denied is allowed."

The security device 100 can use traditional packet filtering or traditional proxies (both described above) to control access to and from the trusted network 220, external network 218, and optional network 222. The security device 100 can also use other types of filtering mechanisms. Examples include stateful dynamic packet filtering methods that build rules dynamically depending on the conditions of the network, and transparent proxies that work at the application level to ensure that ports/protocols necessary to pass packets are opened and closed dynamically.

For instance, the security device 100 can be configured such that a particular user workstation 312 (see, e.g., FIG. 3) cannot accept any kind of packet from the Internet 300 of the external network 218 but can accept packets from other sources. Additionally, the security device 100 can be programmed such that the user workstation 316 cannot accept e-mail messages from either the optional network 222 or the external network 218, but can be configured to accept other types of packets.

Further, if a particular site (e.g., the remote user 306 of the external network 218) attempts to connect to an unauthorized destination (e.g., the SMS station 324), the security device 100 can be configured to automatically add the IP address of the remote user 306 to a "blocked sites list," making activities such as port probes increasingly difficult to carry out by hackers. Similarly, the software program 412 can instruct the security device 100 to log and record activities such as if the remote user 306 tries to repeatedly access the SMS station 324 over a ten-minute period during late evening hours, which is often indicative of a hacker trying to break into the trusted network 220. In such a case, the IP address of the remote user 306 is added to the blocked site list, and the hacker's activities are recorded in the log host 322 (see, e.g., FIG. 3), with an appropriate notification sent to a system administrator for the trusted network 220.

Other options for configuring the security device 100 is to set which events should be logged and which events should trigger notification to the system administrator. The security device 100 is configured by the SMS station 324 using a direct connection to a dedicated serial port such as the console port 208 (see, e.g., FIG. 2) or by using an encrypted network connection. An encrypted network connection allows the system administrator to log in from remote locations to make changes or to check the status of the security device 100.

Figure 5:
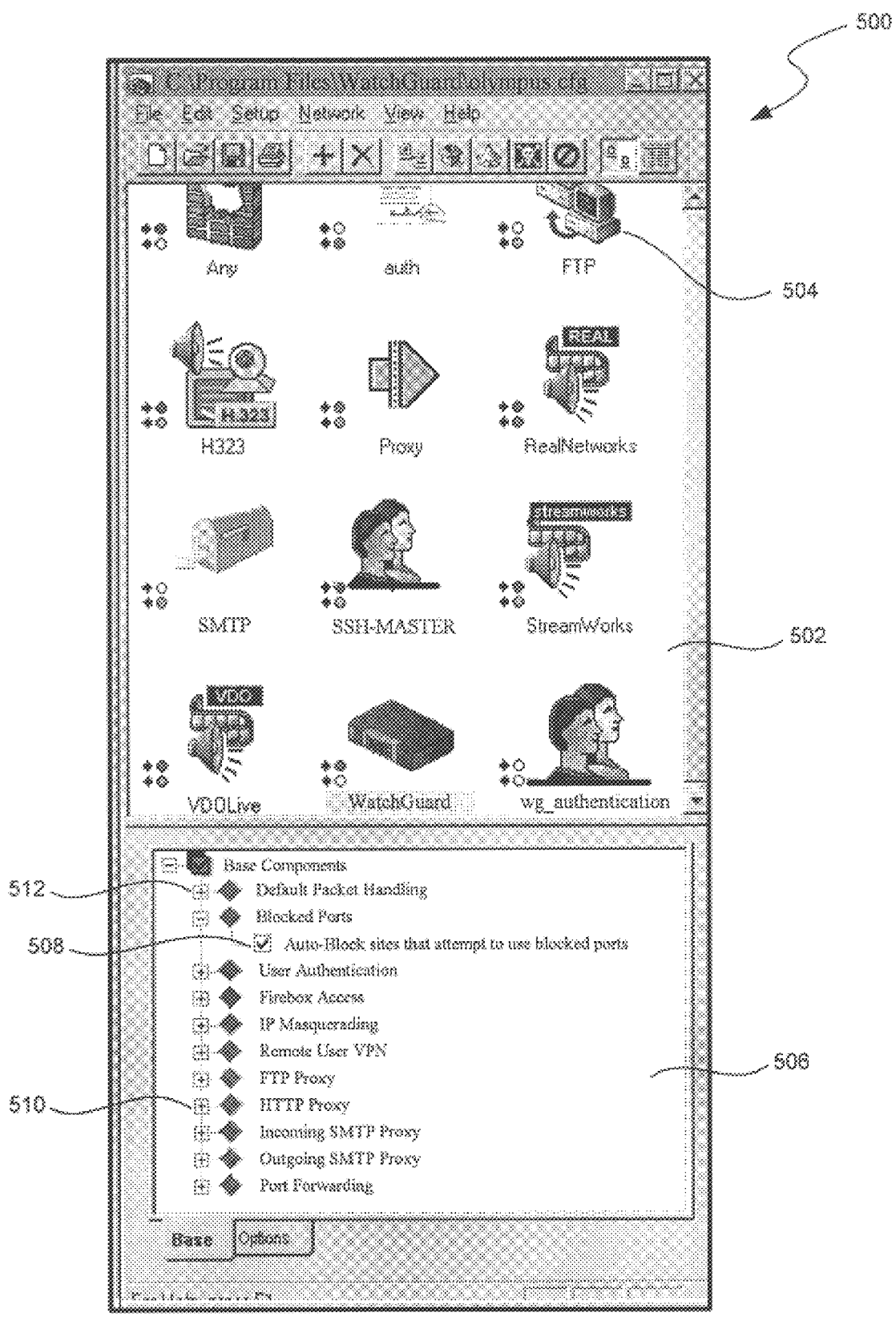
FIG. 5 shows an embodiment of a computer screen that can be used to program various parameters for the embodiment of the security device of FIG. 1.

FIG. 5 shows a software application window 500, such as that for a software application running on Microsoft Windows® operating system, that can be used to configure the security device 100 via the SMS station 324. A first frame 502 shows individual icons, such as an FTP icon 504, that represent each network service. Double-clicking on an icon displays its properties windows, where the system administrator can configure access controls and logging for that particular service. A second frame 506 shows various configuration settings. For instance, a setting 512 allows the system administrator to set the stance for the security device 100. A setting 508, when checked, automatically blocks sites (e.g., the IP address of the remote user 306) that attempt to use a blocked port. A setting 510 sets properties for an HTTP proxy (e.g., an application-level firewall that examines contents of Internet and WWW packets from the external network 218). Many other possible configurations and settings other than those shown in FIG. 5 can be used for the security device 100.

The methods, devices, systems, software programs, and related components described herein provide in a broad sense a "facility" that operates to monitor, process, and display information associated with network traffic. These elements can operate independently or cooperatively to perform the various functions described herein.

Figure 6:
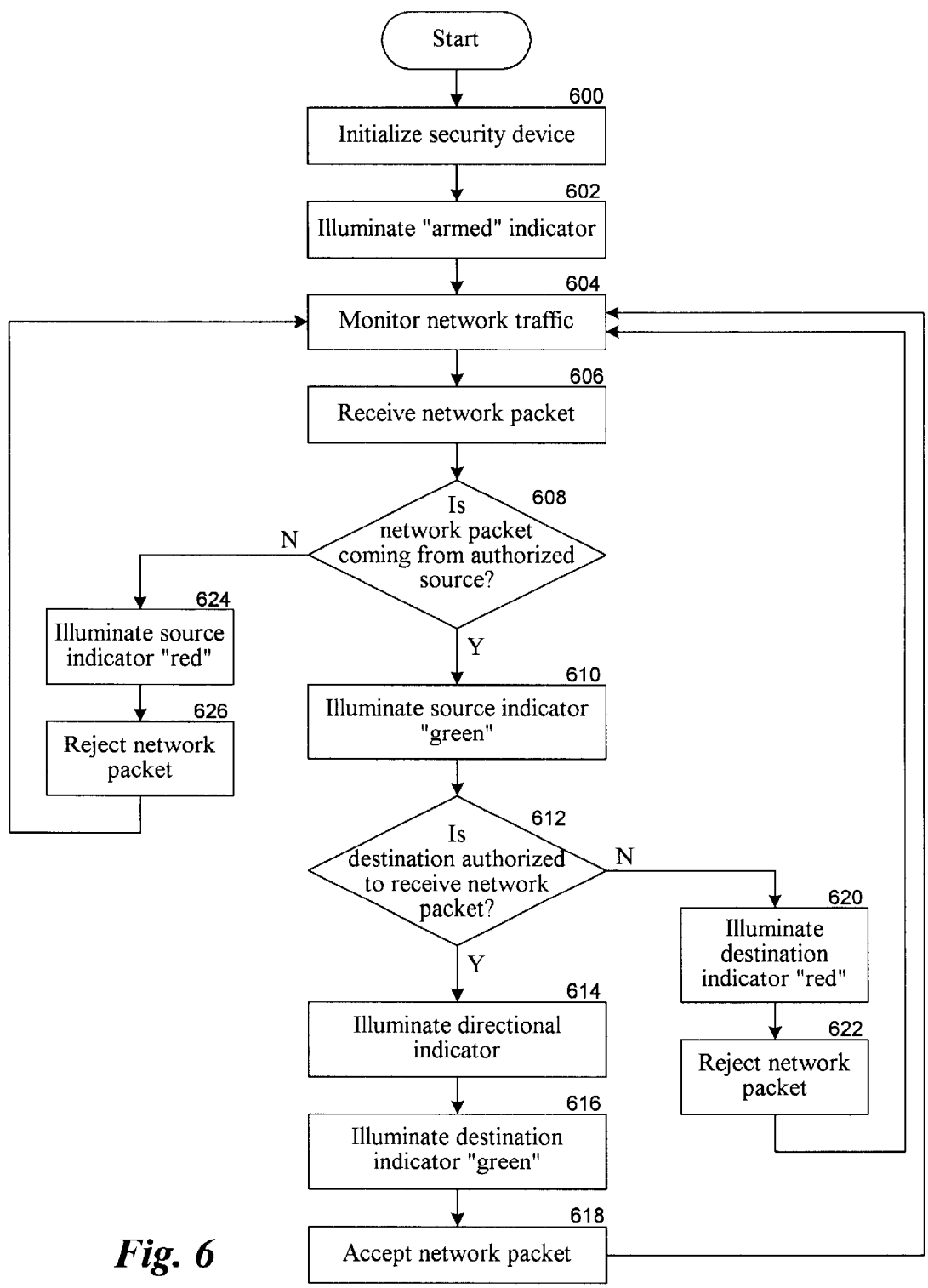
FIG. 6 is a flowchart illustrating operation of the embodiments of the security device and display screen of FIG. 1.

FIG. 6 shows a flowchart that is read in conjunction with FIG. 1 and that illustrates operation of the screen 104 as the security device 100 processes network traffic. To start, the security device 100 is initialized at step 600, such as by supplying AC power to the security device and booting up the software program 412. The "armed" indicator 130 is illuminated at step 602 to indicate that the security device 100 is operational. At step 604, the security device 100 monitors network traffic by monitoring if a packet is sent from a source (e.g., the external network 218) towards a particular destination (e.g., the trusted network 220).

If a packet is received by the security device 100 at step 606, the software program 412 and/or the microprocessor 408 analyzes the packet at step 608 using packet filtering methods to determine if the packet is coming from an authorized source. For instance, the software program 412 checks if an IP address of the packet is that of a remote user 306 in the external network 218 that has been placed on the blocked site list. Another determination that can be made at step 608 is whether the packet itself is authorized, as determined by an application-level proxy program that examines the content of the packet. If the source and/or the packet are not authorized, then the software program 412 causes to be illuminated in red a source indicator (e.g., the indicator 110 associated with the "EXTERNAL" label of FIG. 1) at step 624. The source indicator 110 can stay illuminated for a period of time, such as from four to five seconds, to indicate that the packet is being denied at the port 212 corresponding to the external network 218 (see, e.g., FIG. 2), as indicated at step 626. Thereafter, the security device 100 resumes monitoring network traffic at step 604.

If at step 608, however, the source and/or the packet is determined to be authorized, then the source indicator (e.g., the indicator 110 for the "EXTERNAL" label in FIG. 1) is illuminated green at step 610.

Next at step 612, the security device 100 determines whether a destination of the packet is authorized to receive the packet. Again, this can be done by the software program 412 by using packet filtering methods to determine whether the destination (e.g., the trusted network 220) is authorized to receive traffic from a particular source (e.g., the Internet 300), or by using a proxy to determine if the destination is authorized to receive the type of packet (e.g., an e-mail message from the public server 310 of the optional network 222 of FIG. 3). If the destination is not authorized to receive the packet, then a destination indicator is illuminated red at step 620. The destination indicator can be, for example, the indicator 106 associated with the "TRUSTED" label shown on the screen 104 of FIG. 1. As before, the destination indicator can remain illuminated for an extended period, such as for five seconds, to indicate that the packet is being rejected at step 622 at that interface. Subsequently, the security device 100 resumes monitoring network traffic at step 604, and the steps 604–626 are repeated as appropriate and as described above.

If at step 612, the security device 100 determines that the destination is authorized to receive the packet, then a directional indicator is illuminated at step 614. For instance, the directional indicator 112 of FIG. 1, pointing from the "EXTERNAL" label to the "TRUSTED" label, is illuminated briefly to indicate allowed traffic from the external network 218 to the trusted network 220. Further, at step 616, the destination indicator (e.g., the indicator 106 for the "TRUSTED" label) is illuminated green to indicate that the packet has been accepted at step 618. It is noted that at step 618, the packet can be accepted or passed by connecting the router 308 to an appropriate "route address." A "route address" provides a gateway to an IP address on a network (e.g., an IP address of the workstation 314 of the trusted network 220 of FIG. 3) that the security device 100 recognizes. Thereafter, the security device 100 monitors for the next packet at step 604.

While the security device 100 is performing the analysis of the packets and activating indicators as described above, the load indicator 124 is illuminated at varying levels to indicate a load on the microprocessor 408 as this activity occurs. Similarly, the traffic volume indicator 126 is illuminated at various levels and/or colors to indicate the volume of network traffic through the security device 100.

Additionally, while the activities described with reference to FIG. 6 are occurring, various other functions can be performed by the network security device 100. For example, particular packets that are denied may be concurrently logged in the log host 322 to record the amount of time and number of attempts in which the packet tried to obtain access a particular network. Further, notifications can be automatically sent to the system administrator when any of the activities shown in FIG. 6 are occurring, such as when a packet having an IP address from a blocked site list attempts to access the trusted network 220. In summary, therefore, embodiments of the screen 104 described above allow a convenient, real-time visual indication of network traffic as it is processed by the security device 100.

Figure 7A:
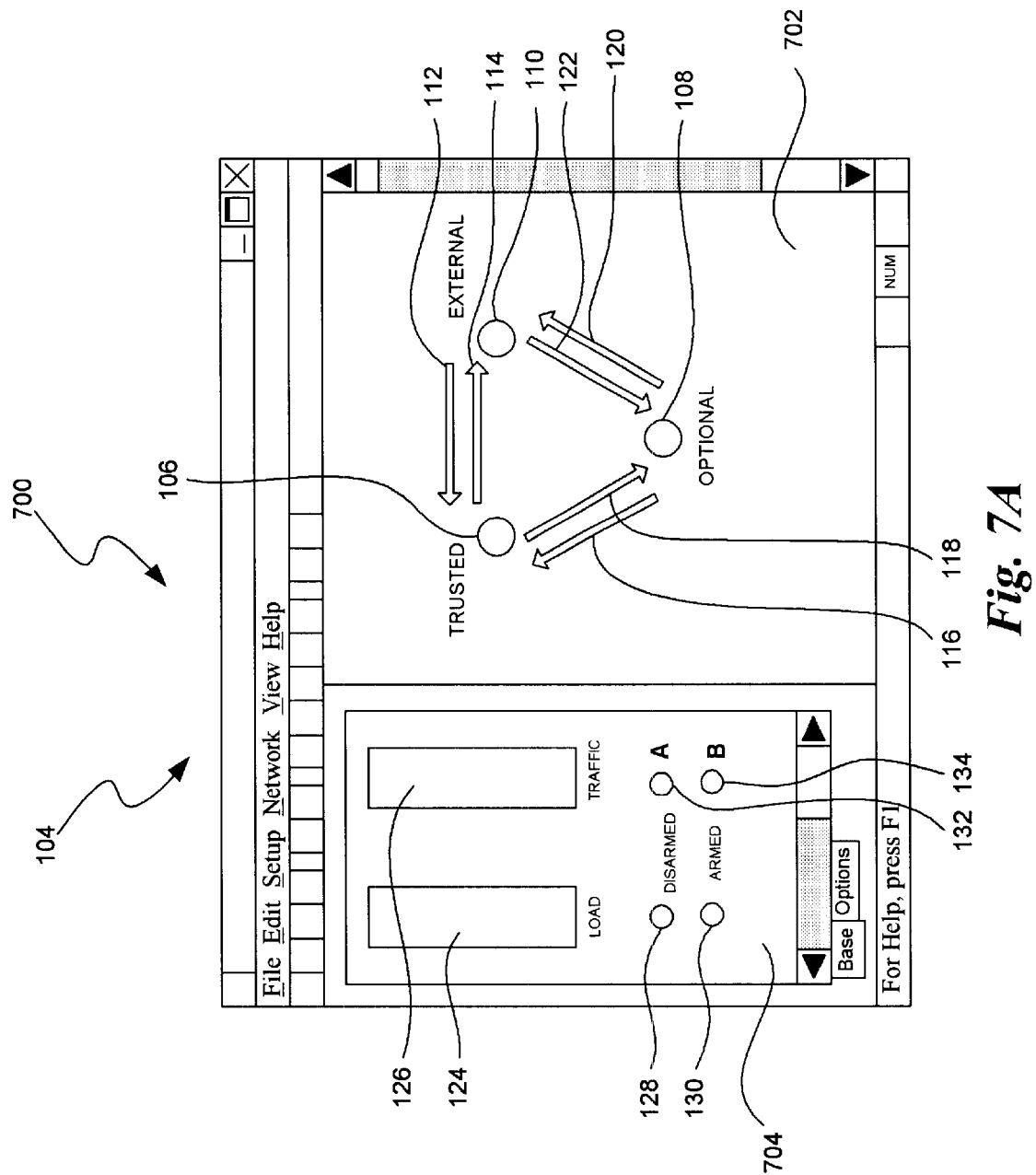
FIG. 7A shows a first alternative embodiment of the display screen.
Figure 7B:
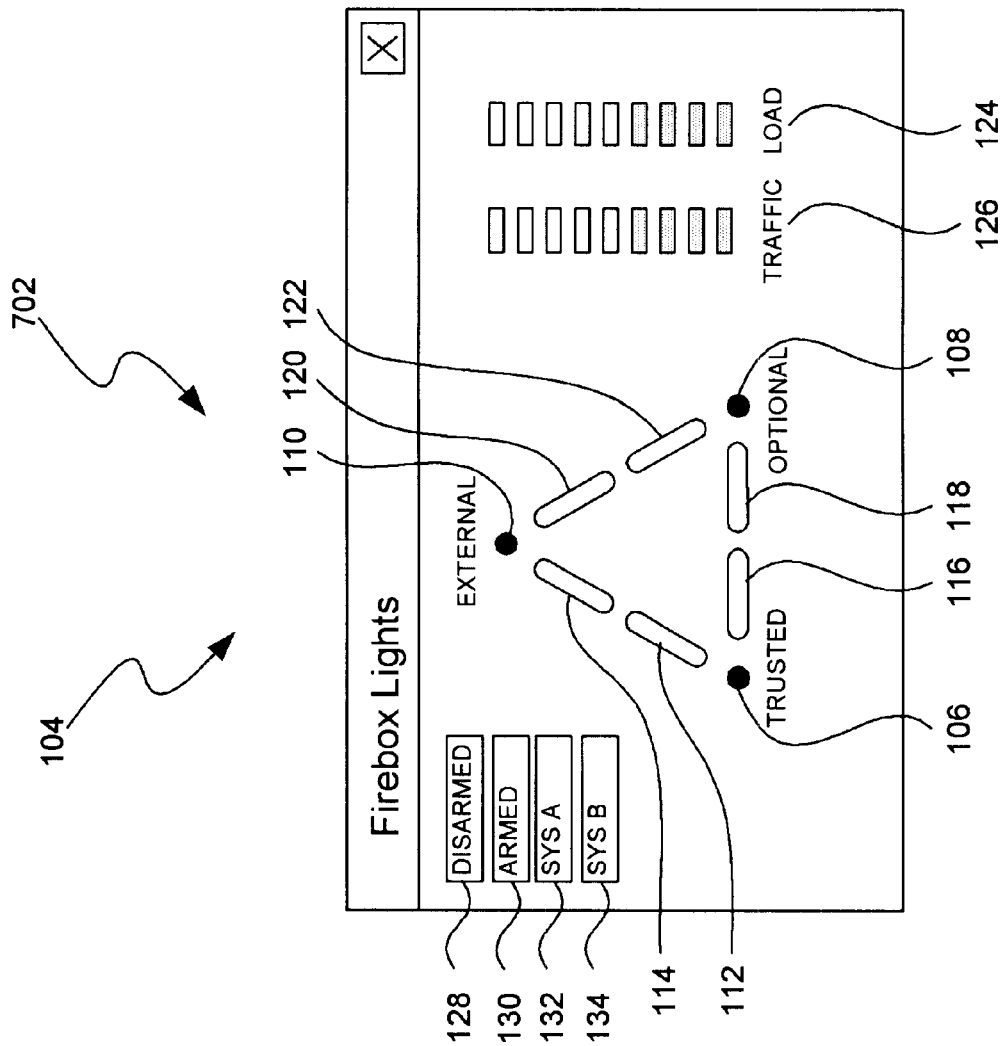
FIG. 7B shows a second alternative embodiment of the display screen.
Figure 7C:
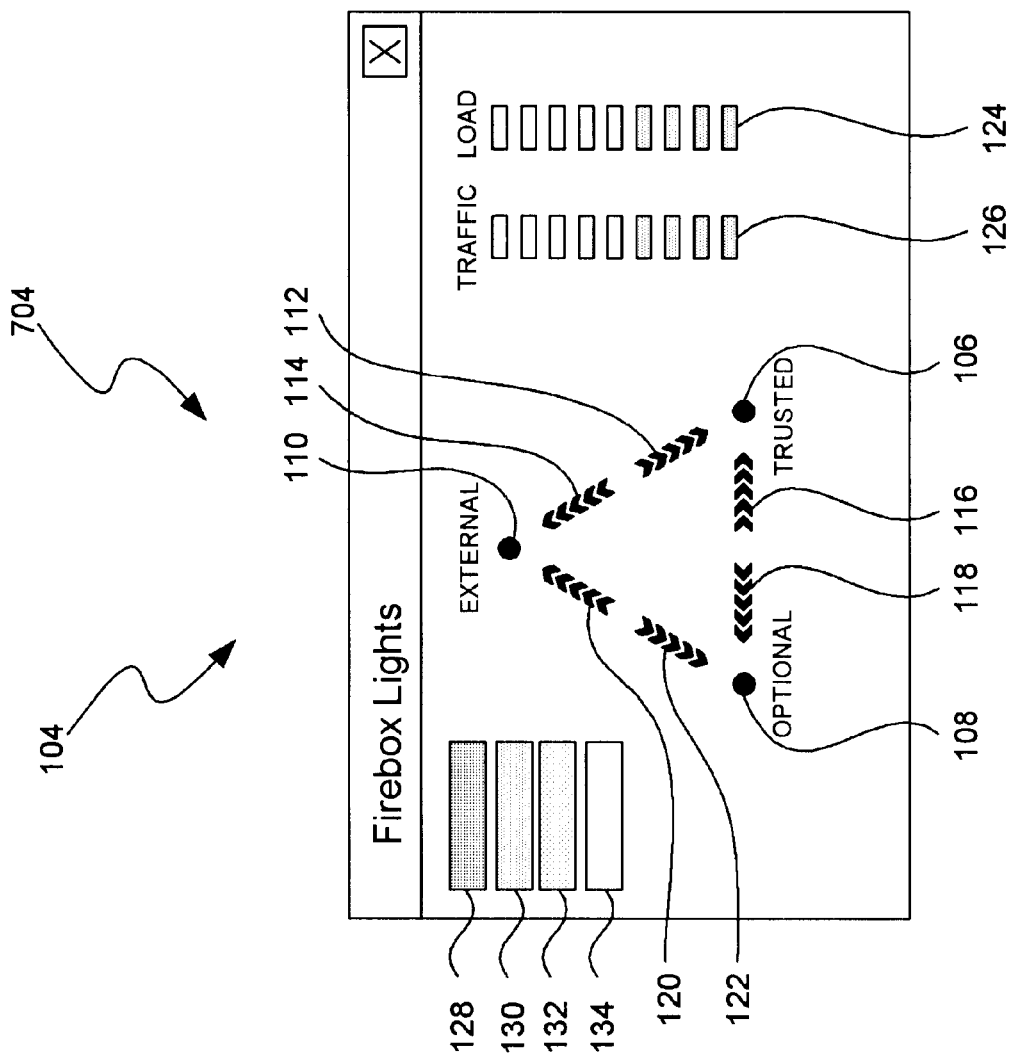
FIG. 7C shows a third alternative embodiment of the display screen.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For instance, FIG. 7A shows a first alternative embodiment of the screen 104, where the screen 104 is disposed on a software application window 700, such as that for a software application running on Microsoft Windows® operating system. Instead of LED indicators, the various indicators of the screen 104 are displayed using computer graphics located within the frames 702 and 704. FIG. 7B shows a second alternative embodiment where the screen 104 is shown on a software application window 702. The window 702 of FIG. 7B includes similar computer graphics and indicators as shown in the window 700 of FIG. 7A. FIG. 7C shows a third alternative embodiment of the screen 104, also disposed on a software application window 704. The windows 700, 702, and 704 can run, for example, on a screen 325 of the SMS workstation 324 of FIG. 3. While the indicators shown in the windows 700, 702, and 704 are shown as computer graphics on a computer screen in these embodiments, it is to be appreciated that indicators having these formats can also be implemented on the screen 104 of the security device 100. The teachings provided herein of embodiments of the invention can also be applied to other network security devices and display screen systems, not necessarily the screen 104 for a security device 100 as described above.

The various embodiments described above can be combined to provide further embodiments. All of the above U.S. patent applications are incorporated by reference. Aspects of embodiments of the invention can be modified, if necessary, to employ the systems, circuits, and concepts of the various patent applications described above to provide yet further embodiments of the invention. These and other changes can be made to the invention in light of the above detailed description. In general, in the following claims, the terms used should not be construed to limit the invention to the specific embodiments disclosed in the specification and the claims, but should be construed to include all display screens that operate under the claims to provide information indicative of network traffic. Accordingly, the invention is not limited by the disclosure, but the scope of the invention is to be determined entirely by the following claims, which are to be construed in accordance with established doctrines of claim interpretation.

What is claimed is:

1. A method of displaying real-time information associated with network traffic, the method comprising:
   determining a source of a received packet;
   determining a destination of a received packet;
   determining if the source or the received packet is authorized;
   displaying a directional indicator if the source is authorized; and
   displaying a first representation of the source if the source is unauthorized, wherein at least one of displaying a directional indicator and displaying a first representation is performed in substantially real-time in accordance with the monitored network traffic.

2. The method of claim 1, further comprising displaying a second representation of the source if the source is authorized.

3. The method of claim 1, further comprising:
   determining if the destination is authorized; and
   displaying a first representation of the destination if the destination is unauthorized or a second representation of the destination if the destination is authorized.

4. The method of claim 1, further comprising displaying the first representation of the source or a first representation of the destination if the received packet is unauthorized.

5. The method of claim 1, further comprising displaying a second representation of the source or a second representation of the destination if the received packet is authorized.

6. The method of claim 1 wherein determining whether the source is authorized includes examining a source address of the received packet.

7. The method of claim 1 further comprising displaying an indicator representative of a volume of the network traffic.

8. The method of claim 1, further comprising displaying an armed or disarmed indicator.

9. The method of claim 1 wherein determining if the received packet is authorized includes examining data in the received packet.

10. The method of claim 1 wherein displaying is performed on a computer screen or on a network security device.

11. The method of claim 1, further comprising:
   providing representations of a trusted network, external network, and another network; and
   displaying a directional indicator between the representations of the trusted and external networks, the trusted and another networks, and the external and another networks to indicate network traffic between the representations of the networks.

12. A screen for a network security device operable to monitor and control network traffic, the screen comprising:
   a representation of a source;
   a representation of a destination;
   a directional indicator pointing towards the representation of the destination and activating if the source or if a received packet is authorized, wherein the representation of the source provides a first indicator if the source is unauthorized, wherein at least one of displaying the directional indicator and displaying the representation is performed in substantially real-time in accordance with the monitored network traffic.

13. The screen of claim 12 wherein the representation of the source provides a second indicator if the source is authorized.

14. The screen of claim 12 wherein the representation of the destination provides the first indicator if the destination is unauthorized or provides a second indicator if the destination is authorized.

15. The screen of claim 12 wherein the representation of the source or the representation of the destination provide the first indicator if the received packet is unauthorized.

16. The screen of claim 12 wherein the representation of the source or the representation of the destination provide a second indicator if the received packet is authorized.

17. The screen of claim 12, further comprising an indicator to indicate a level of the network traffic monitored by the security device, whether the security device is operating, or a load on a processor of the security device.

18. The screen of claim 12 wherein the screen is disposed on a computer screen or on the security device.

19. The screen of claim 12 wherein the representations of the source and the destination include representations of a trusted network, external network, and another network, the screen further including a directional indicator between the representations of the trusted and external networks, the trusted and another networks, and the external and another networks to indicate network traffic between the representations of the networks.

20. A security system to monitor and control network traffic, the security system comprising:
  a plurality of network interfaces coupling the security system to a network and receiving the network traffic;
  a processor coupled to the plurality of network interfaces to process the network traffic; and
  a display screen coupled to the processor and responsive to the processor to display information associated with the network traffic received by the network interfaces, the display screen including:
  a representation of a source;
  a representation of a destination;
  a directional indicator pointing towards the representation of the destination and activating if the source or if a received packet is authorized, wherein the representation of the source provides a first indicator if the source is unauthorized, wherein at least one of displaying the directional indicator and displaying the representation is performed in substantially real-time in accordance with the monitored network traffic.

21. The security system of claim 20 wherein the plurality of network interfaces includes a public network interface and a private network interface.

22. The security system of claim 20 wherein the processor determines if the source is authorized based on addressing information contained in the received packet.

23. The security system of claim 20 wherein the indicators and the representations of the source and destination are individually controlled by the processor.

24. The security system of claim 20 wherein the representation of the source provides a second indicator if the source is authorized.

25. The security system of claim 20 wherein the representation of the destination provides the first indicator if the destination is unauthorized or provides a second indicator if the destination is authorized.

26. The security system of claim 20 wherein the representation of the source or the representation of the destination provide the first indicator if the received packet is unauthorized.

27. The security system of claim 20 wherein the representation of the source or the representation of the destination provide a second indicator if the received packet is authorized.

28. The security system of claim 20 wherein the representations of the source and the destination include representations of a trusted network, external network, and another network, the screen further including a directional indicator between the representations of the trusted and external networks, the trusted and another network, and the external and another network to indicate network traffic between the representation of the networks.

29. The security device of claim 20 wherein the screen is disposed the security device or on a computer screen coupled to the security device.

30. A computer-readable medium whose contents cause a computer-based security facility to monitor network traffic by:
  determining a source of a received packet;
  determining a destination of the received packet;
  determining if the source or the received packet is authorized;
  displaying a directional indicator if the source is authorized; and
  displaying a first representation of the source if the source is unauthorized, wherein at least one of displaying a directional indicator and displaying a first representation is performed in substantially real-time in accordance with the monitored network traffic.

31. The computer-readable medium of claim 30 wherein the contents of the computer-readable medium further cause the security facility to display a second representation of the source if the source is authorized.

32. The computer-readable medium of claim 30 wherein the contents of the computer-readable medium further cause the security facility to:
  determine if the destination is authorized; and
  display a first representation of the destination if the destination is unauthorized or a second representation of the destination if the destination is authorized.

33. The computer-readable medium of claim 30 wherein the contents of the computer-readable medium further cause the security facility to display an indicator to indicate a level of network traffic monitored by the security facility, a load on a processor of the security facility, or whether the security facility is functioning.

34. The computer-readable medium of claim 30 wherein the contents of the computer-readable medium further cause the security facility to reject the received packet based on whether the source, the destination, or the received packet is unauthorized.

35. The computer-readable medium of claim 30 wherein the contents of the computer-readable medium further cause the security facility to:
  provide representations of a trusted network, external network, and another network; and
  display a directional indicator between the representations of the trusted and external networks, the trusted and another networks, and the external and another networks to indicate network traffic between the representations of the networks.

36. The computer-readable medium of claim 30 wherein displaying is on a computer screen or on a network security device.

37. A method of displaying information associated with network traffic, the method comprising:
  at a first facility, determining a source of a received packet, a destination of the received packet, and whether the source or the received packet is authorized; and
  at a second facility, displaying a directional indicator if the source is authorized or displaying a first representation of the source if the source is unauthorized, wherein at least one of displaying a directional indicator and displaying a first representation is performed in substantially real-time in accordance with the monitored network traffic.

38. The method of claim 37, further comprising at the second facility:
  providing representations of a trusted network, external network, and another network; and
  displaying a directional indicator between the representations of the trusted and external networks, the trusted and another networks, and the external and another networks to indicate network traffic between the representations of the networks.

39. The method of claim 37 wherein the first and second facilities are proximately located with respect to each other.

40. The method of claim 37 wherein the first and second facilities are remotely located with respect to each other.

* * * * *

UNITED STATES PATENT AND TRADEMARK OFFICE
CERTIFICATE OF CORRECTION

PATENT NO. : 6,493,752 B1  Page 1 of 1
DATED : December 10, 2002
INVENTOR(S) : Lee et al.

It is certified that error appears in the above-identified patent and that said Letters Patent is hereby corrected as shown below:

Title page,
Item [57], ABSTRCT,
Line 11, "authorized," should be -- authorized. --;

Item [56], References Cited, OTHER PUBLICATIONS, insert --
Cheswick, "Firewalls," *Scientific American*, 279(4): 106-107, October 1998.

Ford, "Digital Certificates," *Scientific American*, 279(4): 108, October 1998.

Gosling, "The Java Sandbox," *Scientific American*, 279(4): 109, October 1998.

Meinel, "How Hackers Break In...and How They Are Caught," *Scientific American*, 279(4): 98-105, October 1998.

Rivest. "The Case Against Regulation Encryption Technology," *Scientific American*, 279(4): 116-117, October 1998.

Zimmermann, "Cryptography for the Internet," *Scientific American*, 279(4): 110-115, October 1998. --;

Column 10,
Line 15, insert comma between "1" and "further";

Column 11,
Line 57, insert -- on -- between "disposed" and "the";

Signed and Sealed this

Twenty-ninth Day of April, 2003

JAMES E. ROGAN
*Director of the United States Patent and Trademark Office*